United States Patent
Dahlberg et al.

(10) Patent No.: US 9,878,767 B2
(45) Date of Patent: Jan. 30, 2018

(54) METHOD OF OPERATING A POWER SYSTEM IN A MARINE VESSEL AND A SUPERVISING ARRANGEMENT FOR A POWER SYSTEM IN A MARINE VESSEL

(71) Applicant: WARTSILA FINLAND OY, Vaasa (FI)

(72) Inventors: Tommy Dahlberg, Vaasa (FI); Stefano Furlan, Trieste (IT); Magnus Kronholm, Vaasa (FI); Arto Ruonala, Vaasa (FI); Giuseppe Sarago, Trieste (IT)

(73) Assignee: WÄRTSILÄ FINLAND OY, Vaasa (FI)

( * ) Notice: Subject to any disclaimer, the term of this patent is extended or adjusted under 35 U.S.C. 154(b) by 0 days.

(21) Appl. No.: 15/129,566

(22) PCT Filed: Apr. 10, 2015

(86) PCT No.: PCT/FI2015/050246
§ 371 (c)(1),
(2) Date: Sep. 27, 2016

(87) PCT Pub. No.: WO2015/155416
PCT Pub. Date: Oct. 15, 2015

(65) Prior Publication Data
US 2017/0166289 A1    Jun. 15, 2017

(30) Foreign Application Priority Data
Apr. 10, 2014 (FI) .................................... 20145340

(51) Int. Cl.
*B60L 3/00* (2006.01)
*B63H 21/21* (2006.01)
(Continued)

(52) U.S. Cl.
CPC ............. *B63H 21/21* (2013.01); *F01N 3/208* (2013.01); *F02D 41/0025* (2013.01);
(Continued)

(58) Field of Classification Search
CPC ..... B63H 21/21; F01N 3/208; F02D 41/0025; F02D 41/021; F02D 41/22
(Continued)

(56) References Cited

U.S. PATENT DOCUMENTS

| | | | |
|---|---|---|---|
| 9,303,610 B2 * | 4/2016 | Jay | ........................ F02M 43/04 |
| 2005/0149248 A1 | 7/2005 | Polen et al. | |

(Continued)

FOREIGN PATENT DOCUMENTS

| | | |
|---|---|---|
| KR | 20120113398 A | 10/2012 |
| KR | 20130107551 A | 10/2013 |
| WO | 2012136208 A1 | 10/2012 |

OTHER PUBLICATIONS

"MARPOL—International Convention for the Prevention of Pollution from Ships", Sep. 21, 2009 (Sep. 21, 2009), pp. 441-441, XP055203860, [Retrieved from the Internet at http://www.mar.ist.utl.pt/mventura/Projecto-Navios-I/IMO-Conventions%20(copies)/MARPOL.pdf].

(Continued)

*Primary Examiner* — Muhammad Shafi
(74) *Attorney, Agent, or Firm* — Heslin Rothenberg Farley & Mesiti P.C.; Victor A. Cardona, Esq.

(57) ABSTRACT

A method of operating a power system in a marine vessel, which power system is operable with at least two operational modes, includes providing a restriction information map by assigning geographical areas with one or more predetermined operational restrictions set for the power system, comparing the location information of the vessel and the restriction information map, and in case the restriction (Continued)

information map includes one or more restrictions assigned to the current location, initiating an intensified supervision operation of the power system, during which data logging operation is initiated and maintained which comprises recording at predetermined interval at least current location information of the vessel, and a specification of used operational mode of the power system at the location and saving the recorded items in a memory media.

15 Claims, 3 Drawing Sheets

(51) Int. Cl.
    *F02D 41/22*     (2006.01)
    *F02D 41/02*     (2006.01)
    *F01N 3/20*     (2006.01)
    *F02D 41/00*     (2006.01)

(52) U.S. Cl.
    CPC .......... *F02D 41/021* (2013.01); *F02D 41/22* (2013.01); *B63H 2021/216* (2013.01); *F01N 2590/02* (2013.01); *F02D 2041/227* (2013.01); *F02D 2200/701* (2013.01)

(58) Field of Classification Search
    USPC .......................................................... 701/21
    See application file for complete search history.

(56) References Cited

U.S. PATENT DOCUMENTS

| | | |
|---|---|---|
| 2007/0137514 A1 | 6/2007 | Kumar et al. |
| 2008/0288132 A1 | 11/2008 | King et al. |
| 2013/0158752 A1* | 6/2013 | Norton ................ F02D 41/021 |
| | | 701/19 |
| 2013/0247875 A1* | 9/2013 | Jay ........................ F02M 43/04 |
| | | 123/447 |
| 2016/0169133 A1* | 6/2016 | Yeager ................ F02D 41/0027 |
| | | 123/435 |

OTHER PUBLICATIONS

International Search Report and Written Opinion for International Application No. PCT/FI2015/050246, dated Jul. 30, 2015.
Search Report for priority Finnish Patent Application No. FI 20145340, dated Nov. 12, 2014.

* cited by examiner

METHOD OF OPERATING A POWER SYSTEM IN A MARINE VESSEL AND A SUPERVISING ARRANGEMENT FOR A POWER SYSTEM IN A MARINE VESSEL

CROSS REFERENCE TO RELATED APPLICATIONS

This application is a national stage of PCT International Application No. PCT/FI2015/050246, filed on Apr. 10, 2015, and published in English on Oct. 15, 2015, as WO 2015/155416 A1, and claims priority of Finnish application No. 20145340 filed on Apr. 10, 2014, the entire disclosure of these applications being hereby incorporated herein by reference.

TECHNICAL FIELD

The present invention relates to method of operating a power system in a marine vessel and a supervising arrangement for a power system in a marine vessel.

BACKGROUND ART

Internal combustion engines are widely used as prime movers and other power systems in marine vessels. In order to optimize the operation of internal combustion engines i.a. in a point of view of emissions, the engines are typically controlled by an electronic control system by means of which the operation may be controlled such that various control values can have an effect on the overall operation of the engines.

In marine vessels the use of so called dual fuel engines operated mainly with gaseous fuel are widely recognized as an environmentally friendly solution. Environmental issues become more and more important and in the operation of power system of marine vessel should be operated accordingly.

Internal combustion engines in general may be provided with exhaust gas emission abatement system external to the engine, in order to meet the requirements set for the emissions. Although the usage of such abatement systems are beneficial in terms of exhaust gas emission level, often the usage of such abatement system involves using additional resources which may have an effect on the engine efficiency and/or incur additional costs.

There are areas or regions in the world where special or different emission regulations are applied and the vessels operation within such region must meet the regulations. The emissions from power systems, such as propulsion engines and auxiliary engines, in marine vessels have a strong relation to the manner of operating them. Therefore, there is a need to make sure that the power systems operate according to set requirements.

DISCLOSURE OF THE INVENTION

An object of the invention is to provide a method of operating a power system in a marine vessel by means of which the power system is operated in environmentally secure manner.

An object of the invention is also to provide a supervising arrangement for operating a power system in a marine vessel by means of which the power system is operated in environmentally secure manner.

An object of the invention is substantially met by a method of operating a power system in a marine vessel, the method comprising steps of
  providing a restriction information map by assigning geographical areas with one or more predetermined operational restrictions set for the power system,
  acquiring location information of the vessel,
  acquiring the actual operational mode of the power system,
  reading the restriction information map to obtain the restriction information relevant to the current location of the vessel,
  comparing the location information and the restriction information map, and in case the restriction information map includes one or more restrictions assigned to the current location, initiating an intensified supervision operation of the power system, during which
  data logging operation is initiated and maintained which comprises recording at predetermined interval at least current location information of the vessel, and specification of used operational mode of the power system at the location.

The invention is characterized by saving the recorded items in a memory media, setting at least one operational restriction to the power system during the intensified supervision operation and in case of an emergency situation is detected cancelling the setting of the at least one operational restriction to the power system.

According to the invention method comprises a step of cancelling the setting at least one operational restriction to the power system in case of an emergency situation. Additionally the information of such cancelling is advantageously subjected to the data logging operation i.e. the event of cancelling the operational restriction is saved in the memory media. This provides an option to continue using the current operational mode without the restriction if that is not possible for some reason to be defined by an officer person being is responsible of the vessel.

According to an embodiment of the invention a status of safety of the vessel is monitored and in case a situation of the vessel where the vessel and/or its passengers and/or the crew are/is in imminent danger, or a special situation ruled by the officer in charge of the vessel to be an emergency situation, or a situation where the actual emergency is only about to take place is detected, the emergency detection is declared confirmative.

By means of the invention it is possible to verify that the power system is operating and has been operated using certain operational modes which comply for example with specific rules assigned to a certain geographical area. According to an embodiment of the invention the duration of each used operational mode is recorded separately.

According to an embodiment of the invention cancelling the setting of the at least one operational restriction is allowed during a limited predetermined period of time and after the period of time has lapsed the at least one operational restriction to the power system is reset.

According to an embodiment of the invention the predetermined interval may be set to be different for recording and saving the item in the memory media, whereas the saved values are average values of unsaved recoded values. The recording interval may be 1-60 seconds and the saving interval may be 2-5 times the recording interval.

According to the invention the power system is operable with at least two alternative operational modes, which may be referred to as the first operational mode and the second operational mode. The operational modes result in exhaust gas emissions at different levels, types or categories. The actual operational modes which the power system may be set to operate with may be categorized into one of the classes of an accepted operational mode and a non-accepted operational mode. The power system may also include an external exhaust gas emission abatement system in order to meet the requirements set for the emissions.

It should be noted that here the terms "accepted" and "non-accepted" are related to certain location. The operational modes may be categorized for example such that the power system is operable using means belonging to the non-accepted operational mode which results in greater exhaust gas emission level than the accepted operational mode. Respectively the power system is operable using means belonging to the accepted operational mode which results in less exhaust gas emission level than the non-accepted operational mode, The emission level, type and/or category which is/are used in definition of the accepted operational mode and the second operational mode may comprises one or more of the following: $NO_x$, $SO_x$, $CO_2$, particulate matter and noise emission.

There are various possible operational steps and/or procedures relating to operation of, as well as technical devices applicable to an internal combustion engine, known in the art as such, each of which have an effect on the emission level and/or type of the emission and may therefore be a subject to a predetermined operational restriction. Each of these may be categorized into one group of the first and the second operational mode. The actual case to which one of the groups each operation step and/or procedure and/or technical device belong is determined directly or indirectly by the restriction map according to the present invention.

According to an embodiment of the invention the internal combustion engine is an internal combustion piston engine.

In an embodiment where the power system is an internal combustion the operational steps and/or procedures relating to the method operating the engine, as well as technical devices applicable to an internal combustion engine may be selection between at least two different fuel, using of exhaust gas emission abatement device, such as catalytic or non-catalytic exhaust gas reduction system, exhaust gas recycling, water injection into the combustion air and/combustion process, etc.

Accordingly, when the power system comprises an exhaust gas emission abatement system and the at least one operational restriction may comprise preventing switching of the abatement system off.

When the engine is a multi-fuel piston engine it may be operated with gaseous fuel, such as natural gas, i.e. in gas mode representing the first operational mode, and with liquid fuel, such as marine diesel oil or light fuel oil i.e. in liquid fuel mode representing the second operational mode. It should be noted that a diesel mode is a specific form of the liquid fuel mode. Now, in some areas the gas mode may represent the accepted operational mode due to its low emissions and the liquid mode may represent non-accepted operational mode due to its greater emissions.

According to an embodiment of the invention the method comprises a further step of setting at least one operational restriction to the power system during the intensified supervision operation and the information of such cancelling is subjected to the data logging operation.

This way, in case there are specific restrictions assigned to a geographic area those restrictions are verifiably obeyed once the vessel enters into such area. So in addition to making it possible to verify that the power system is operating and has been operated using certain operational modes which comply for example with specific rules assigned to a certain geographical area, the actual operation mode is ruled by detected geographic area and operational restrictions set to the power system according to the restriction information map.

According to an embodiment of the invention the power system is operable in a manner belonging to an accepted operational mode and in a manner belonging to a non-accepted operational mode and the at least one operational restriction comprises restricting the operation of the power system using the non-accepted operational mode.

According to a specific embodiment of the invention the internal combustion engine is a piston engine operable in a gas mode being an accepted operational mode and in a diesel mode being a non-accepted operational mode and that the at least one operational restriction comprises restricting the operation of the engine in the diesel mode.

According to an embodiment of the invention the operational restriction comprises limitation to allowed emissions into the atmosphere, and the power system comprises an internal combustion engine plant operable in at least two operational modes which result in different emission levels when used.

According to an embodiment of the invention the combustion piston engine is a piston engine operable in a gas mode and in a diesel mode and that the at least one operational restriction comprises restricting the operation of the engine in the diesel mode.

According to an embodiment of the invention the at least one operational restriction comprises restricting the operation of the engine in the diesel mode combustion heavy fuel oil.

According to an embodiment of the invention the restricting of operation in the diesel mode comprises granting full operability in diesel mode in case of emergency only during a predetermined time enabling a safe limp home operation.

According to an embodiment of the invention the restricting of operation in the diesel mode comprises granting operation at nominal power during a predetermined period of time and after that at a lower power less than the nominal power.

The predetermined period of time may be for example 2 hours and the lower power less than the nominal power may be for example 50% of the nominal power.

According to an embodiment of the invention the internal combustion piston engine plant comprises a selective catalytic reduction system and the at least one operational restriction comprises preventing the switching the selective catalytic reduction system off.

Object of the inventions is also met by a supervising arrangement for a power system in a marine vessel, which power system comprises a control unit adapted to control the power system to operate with at least two operational modes, the supervising arrangement comprising a location information receiving system adapted to acquire location information of the vessel a processing unit, which is arranged to communicate with the location information receiving system and the control unit provided with instructions an input unit for acquiring the actual operational mode of the power system from the control unit, the input unit is arranged to read a restriction information map in which geographical areas are assigned with one or more predetermined operational restrictions, and to obtain the restriction information relevant to the current location of the vessel, and to compare the location information and the restriction information map, and in case the restriction information map includes one or more restrictions assigned to the current location, to initiate an intensified supervision operation of the power system, during which the processing unit is arranged to initiate and maintain a data logging operation to record at predetermined interval at least current location information of the vessel, and a specification of used operational mode of the power system at the location, and the input unit is further arranged to save the recorded items in a memory media, and to set at least one operational restriction to the power system during the intensified supervision operation and to cancel the setting of the at least one operational restriction to the power system in case of an emergency situation is detected.

According to an embodiment of the invention the processing unit comprises instruction to record of the using a predetermined time interval and the storing the recorded items in the non-volatile memory media by defining an average value of a number of sequential recorded values.

According to an embodiment of the invention the power system is a gas engine and processing unit comprises instructions to allow diesel mode operation only in emergency circumstances.

According to an embodiment of the invention the the processing unit comprises instructions enabling the switch off the restriction of gas mode only, and operating the engine in liquid fuel mode.

By means of the invention it is possible to constantly monitor and record the engine operation mode. This provides the possibility to verify compliancy of the engine with the regulations during lifetime.

In the embodiment of dual fuel engine the full operability may be granted in also diesel mode or liquid fuel mode in case of emergency enabling a safe limp home operation.

In connection with this application the emergency situation or circumstances may include, in addition to actual emergency situation where the vessel and/or its passengers and/or the crew are/is in imminent danger, a special situation ruled by the officer in charge of the vessel to be an emergency situation, or a situation where the actual emergency is only about to take place unless a counter measure is commenced as soon as possible.

BRIEF DESCRIPTION OF DRAWINGS

In the following, the invention will be described with reference to the accompanying exemplary, schematic drawings, in which.

DETAILED DESCRIPTION OF DRAWINGS

Figure 1:
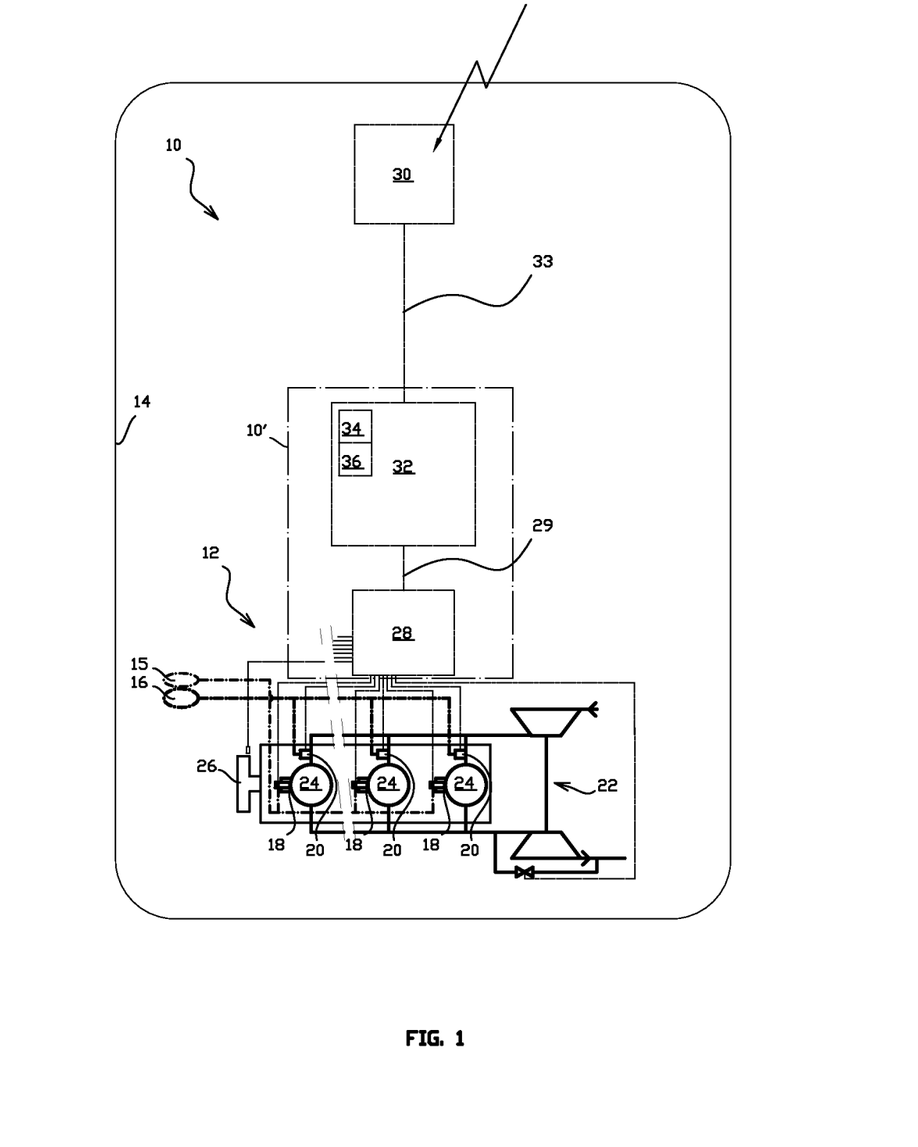
FIG. 1 illustrates a supervising arrangement for operating a power system in a marine vessel according to the first embodiment of the invention.

FIG. 1 depicts schematically a supervising arrangement 10 for operating a power system 12 in a marine vessel 14. The power system 12 is operable with at least two alternative operational modes which result in exhaust gas emissions at different levels or categories. The operational modes may be called also as accepted operational mode and non-accepted operational mode which refers to exhaust gas emission level in respect to local regulations or requirements. The power system is here a dual fuel internal combustion piston engine 12, capable of operated e.g. with gaseous and liquid fuels. For sake of simplicity the term engine may be used instead of dual fuel internal combustion engine.

The engine 12 is in connection with a source of a gaseous fuel 16, such as natural gas and a source of liquid fuel 15, such as marine diesel oil (MDO). The engine comprises liquid fuel injectors 18 arranged in connection with the cylinders 24 of the engine, optionally provided with pre-chambers. The engine comprises also gas admission valves 20 arranged in connection with intake channels of the engine. The engine is advantageously turbocharged engine with at least one turbocharger unit 22. The engine may be connected to an electric generator 26 to provide power for e.g. propulsion systems of the vessel (not shown). The gas engine according to a preferred embodiment of the invention is arranged to use the MDO liquid fuel source and its fuel introduction system serves also as a backup system.

Even if not shown in the FIG. 1 the engine, according to an embodiment of the invention is provided with a third fuel source, namely a source of heavy fuel oil (HFO) and injection system adapted to inject heavy fuel oil into the cylinders. The third injection system is normally intended to be used as a back-up system, and the engine being then operated in diesel mode.

The combustion concept of the engine shown in FIG. 1 allows alternatively a diesel operation mode utilizing single liquid fuel (MDO, HFO) or a gas operation mode utilizing e.g. natural gas as the main fuel. Both of the operational modes utilize advantageously liquid fuel injection with compression ignition, even if e.g. a spark ignition during the gas mode may also be conceivable. In the gas mode the engine is operating with the otto-principle and according to so called lean burn principle. The natural gas is injected in the intake ports and premixed air and fuel is introduced into the cylinder. Ignition is accomplished with a pilot fuel injection of suitable liquid fuel, such as marine diesel oil (MDO). MDO is injected directly into the cylinder or a pre-chamber thereof initiating the combustion. Particularly the lean burn gas mode provides considerably low emission levels.

The engine 12 is provided with a control unit 28 which is adapted to control the engine 12 to alternatively run in the first mode of operation or in the second mode of operation. In the embodiment shown in FIG. 1, where the engine is a dual fuel engine, the first mode of operation is gas mode operation and the second mode of operation is diesel mode operation, which result in exhaust gas emission at different levels or magnitudes.

Now, in order to increase the environmental reliability of the power system and the marine vessel, there is the supervising arrangement 10 arranged in connection with the engine 12. The supervising arrangement 10 comprises as its main component a processing unit 32 and location information receiving system 30. The processing unit is adapted to perform operations by means of which the operation of the power system 12 i.e. the engine may be effectively verified and also controlled. The location information system 30 may be realized by providing a data transmission connection with the vessel's position tracking system.

The processing unit 32 is adapted to communicate with the control unit 28 of the engine and there is a data transfer communication link 29 arranged between the control unit 28 and the processing unit 32 for that purpose. Facilitated by the communication feature the processing unit 32 is adapted to receive measured or otherwise determined status information of the engine's operation via the data transfer communication link 29. Particularly, the processing unit is adapted to receive a specification of currently used operational mode of the power system 10.

The supervising arrangement 10 further comprises a location information receiving system 30, which is adapted to acquire constantly or intermittently information of the location of the vessel 14. There is a data transfer communication link 33 arranged between the location information receiving system 30 and the processing unit 32 for that purpose. The location information receiving system 30 is based on for example a receiver of the Global Positioning System (GPS) signal, which is an example of a space-based satellite navigation system that provides location information usable for the invention.

The location information receiving system 30 is arranged to communicate with the processing unit 32 so that the location information is made available to the processing unit. The location information receiving system 30, particularly if being the GPS system, may deliver time stamp information to the processing unit 3, as well.

The processing unit 32 comprises a first storage unit 34 into which a restriction information map is stored. The restriction information map is arranged to contain information of geographical areas or locations and possible operational restrictions related to the areas or locations and being relevant to the operation of the power unit 12 at the areas. As an advantageous embodiment the operational restrictions are exhaust gas related restrictions. So, the restriction relates advantageously to exhaust gas emissions of the power unit 12 and may be set for example to an area where only a certain $NO_x$ and/or $SO_x$ levels in the exhaust gas are permitted.

The restriction information map is formed by assigning geographical areas with one or more predetermined operational restrictions. This may be implemented for example by defining a range of latitude/longitude pair within which range a certain restriction is applied.

The processing unit 32 comprises further a second storage unit 36, which comprises a non-volatile memory media. The non-volatile memory media of the second storage unit 36 is utilized for purposes which will become apparent later. The first 34 and the second 36 storage units may physically be the same device having dedicated areas for the different information. According to the invention the second storage unit 36 comprises a non-volatile memory media which can be written once and read arbitrarily many times.

The processing unit 32 comprises instructions to acquire the location information of the vessel from the location information receiving system 30 and make it available for the processing. The processing unit comprises also instructions to acquire and make available for processing the actual operational mode of the power system 12.

Further, the processing unit comprises instructions to read the restriction information map in the first storage unit 34, and to select the restriction information relevant to the current location of the vessel and compare the location information and the restriction information map. The instructions comprises still further, in case the comparison reveals that the restriction information map includes one or more restrictions assigned to the current location, execution of initiating an intensified supervision operation of the arrangement 10.

For the intensified supervision operation of the arrangement 10, i.e. for the situation where the comparison described above results in an existence of a restriction at the current location, the processing unit comprises instructions to initiate and maintain a data logging operation which comprises instructions to record at predetermined time interval at least
  current location information of the vessel,
  a specification of used operational mode of the power system 12 at the location
and storing the recorded items in the non-volatile memory media of the second storage unit 36.

This way the supervising arrangement provides means for increasing the environmental reliability and verifiability of the operation. When the vessel is in the region where exits possible operational restrictions relevant to the operation of the power unit 12 the operational status of the engine 12 is stored in non-volatile memory media for later inspection and verification of the situation. The non-volatile memory media 36 is advantageously set as allowing only writing and reading the information but preventing any modification of stored information.

The predetermined interval is advantageously not more than 15 seconds depending to the actual case. Naturally, if it is allowed to have less accurate supervision, it is possible to decrease the rate. According to an embodiment of the invention the recording of the items takes place using interval not more 15 seconds and the saving the recorded items in the non-volatile memory media is performed by defining an average value of a number of sequential recorded values. The recording average values may be performed once in a minute.

The processing unit comprises according to an embodiment a computer device and the instructions relating to the processing unit are according to the embodiment in a form of computer executable program. As is depicted by the reference number 10' the processing unit and the control unit 28 may be arranged into a one computer device or they may be separate devices as is exemplary shown in FIG. 2.

According to an the invention the processing unit 32 comprises instructions for the intensified supervision operation, i.e. for the situation where the comparison described above results in an positive indication of a restriction at the current location, further instructions to command to the control unit 28 of the power system 12 to change into a restricted mode operation. This may be conceived as more advanced mode of intensified supervision operation. The restricted mode operation is realised by the control unit 28 based on the restricted mode operation instructions which are stored in the processing unit 32.

In order to run the restricted mode operation the processing unit 32 comprises firstly an instruction to designate the gas mode as only available normal running mode. This way, when the vessel 14 is in the area having operational restrictions relating to gaseous emission levels, during normal operation only the gas mode operation of the engine 12 is allowed by the supervising arrangement 10, and by means of the arrangement 10 the at least one operational restriction subjected to the engine 12 comprises restricting the operation in the diesel mode.

Additionally the processing unit comprises instructions to allow diesel mode operation only in emergency circumstances. This is despite the fact that the gas mode has been designated as the only available normal running mode in the restricted mode. These instructions are transmitted by the processing unit 32 to the control unit 28. The instructions for emergency circumstances include enabling the switch off the restriction of gas mode only, in the event that a gas related failure condition is present, and the load reduction of the engine is not allowed. Such a reduction of load could some cases possibly remove the cause for the failure condition. According to a special embodiment of the invention the instructions for emergency circumstances include also instruction to operate the engine 12 by using the MDO for both the pilot fuel and main fuel and preventing the operation of the engine with HFO fuel, in case the engine is provided with diesel mode fuel injection system adapted to utilize HFO. Thus, the restricting of operation in the diesel mode comprises granting full operability in diesel mode in case of emergency only during a predetermined time enabling a safe limp home operation. Also, and particularly during the emergency circumstances the data logging operation is maintained which comprises instructions to record at predetermined interval at least the current location information of the vessel, a specification of used operational mode of the power system 12 at the location and storing the recorded items in the non-volatile memory media of the second storage unit 36.

The instructions for emergency circumstances include also setting a time period for nominal power during a predetermined period of time, which may be for example 1-5 hours and allowing usage of only limited power, less than the nominal engine power after the time period. And still, instruction relating to intensified supervision operation are applied during the emergency circumstances. Thus, the restricting of operation in the diesel mode may comprise granting 1-5 hours operation at nominal power and after that less than nominal power.

With the reference to FIG. 1 the operation of the supervising arrangement 10 is explained in connection with a dual fuel internal combustion engine 12 is a marine vessel 14.

Firstly the restriction information map must be provided for disposal of the arrangement 10. This is accomplished by assigning geographical areas with one of more predetermined operational restriction set for the power system 12. It is clear that this step is typically practiced only according to need e.g. when the information is changed. The restriction information map is advantageously stored in the first storage unit 34. When practicing the method the location information is acquired by the read by the location information receiving system 30 for use in a comparing procedure. Prior to the comparing procedure the restriction information map is read to obtain the restriction information relevant to the recently acquired current location of the vessel i.e. if there is any relevant restriction set to the operation of the engine. Particularly the restrictions related to exhaust gas emissions of the engine such as maximum allowed emissions into the atmosphere. Now, in the comparing procedure the location information and the restriction information map, and in case the restriction information map includes one or more restrictions assigned to the current location, the intensified supervision operation of the power system is initiated.

During the intensified supervision operation the data logging operation is initiated and maintained which comprises recording at predetermined interval at least the current location information of the vessel 14, and a specification of used operational mode of the power system at the specific location as well as saving the recorded items in the memory media of the first storage unit 34. Preferably also the duration of the each used operational mode is recorded as well. It is also conceivable to transmit the recorded items to a land-based third storage unit.

In order to provide even more advanced method at least one operational restriction to the power system may be set during the intensified supervision operation. This way in addition to saving the above mention item into a non-volatile memory medium the operation of the engine is restricted to be selected from a group of accepted operational modes.

Figure 2:
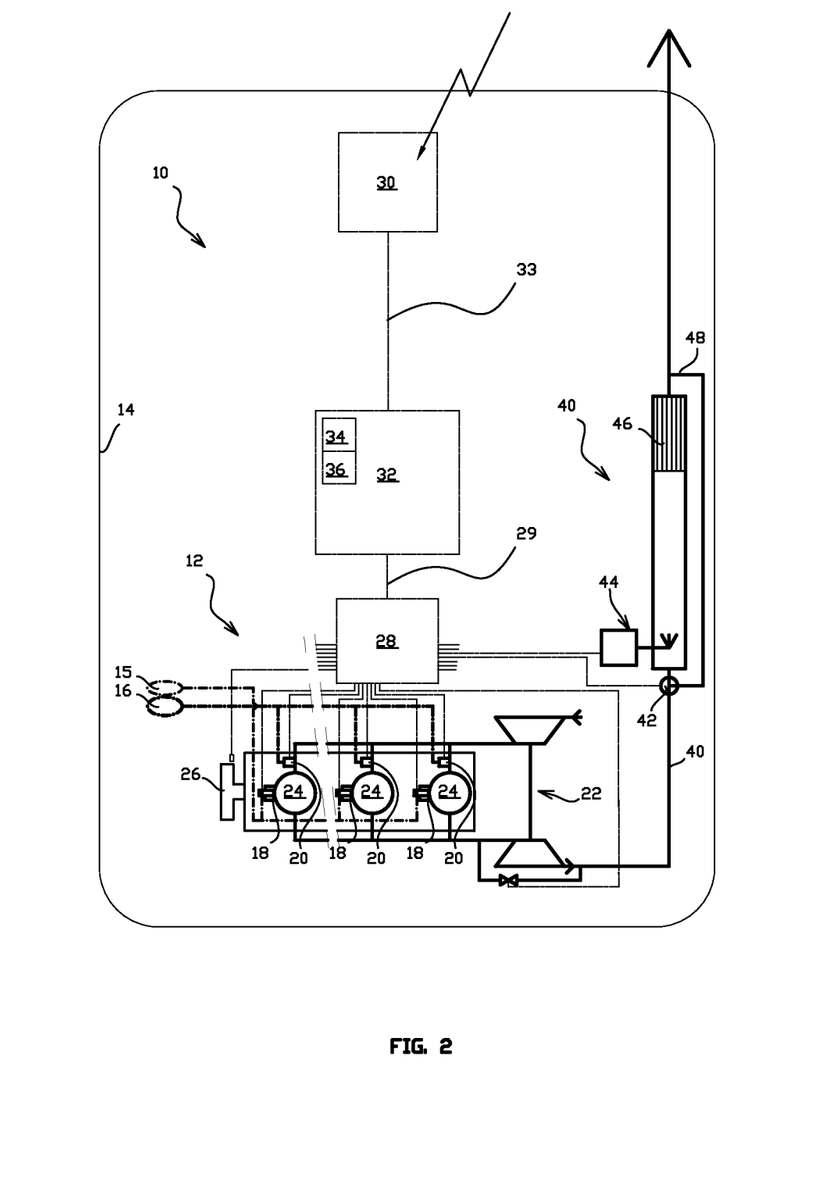
FIG. 2 illustrates a supervising arrangement for operating a power system in a marine vessel according to another embodiment of the invention, and FIG. 3 illustrate an exemplary chart describing the present invention implemented in a dual fuel engine.

In the FIG. 2 there is shown schematically a supervising arrangement 10 for operating an internal combustion engine unit 12 in a marine vessel 14. The engine 12 is operable with at least two alternative operational modes which result in exhaust gas emission at different levels, the modes may be called also as accepted operational mode and non-accepted operational mode. In this embodiment the operational modes accomplished by following setup. Even if a piston engine is shown in the figure the engine may also be for example a gas turbine unit.

In addition to what is disclosed in FIG. 1 the engine unit in FIG. 2 comprises a selective catalytic reduction system SCR 40 in connection with its exhaust gas channel 42 of the engine 12. The selective catalytic reduction system comprises a catalyst unit 46, and an optional reductant introduction unit 44 and a by-pass duct 48 for by-passing the selective catalytic reduction system 40. The by-pass duct 48 is provided with a valve device 42 by mean of which the gas flow may be controlled between the selective catalytic reduction system 40 and the by-pass duct 48.

The valve device and/or the reductant introduction unit 44 are connected to the control unit 28 of the engine. The connection may be alternatively or additionally to the processing unit 32 which is not shown here. In this embodiment the power system 12 is operable with at least two alternative operational modes which result in exhaust gas emission at different levels, the modes may be called also as accepted operational mode and non-accepted operational mode. One of the operational modes comprises setting the valve unit 42 such that leading the exhaust gases to the catalytic reduction system 40 takes place and introducing reactant into the exhaust gas prior to its introduction in the catalyst unit 46. Accordingly in this embodiment the processing unit 32 comprises instruction to initiate the operation by the control unit 28. Another operational mode is setting the valve unit 42 such that leading the exhaust gases to by-pass duct 38 takes place. Accordingly in this embodiment the processing unit 32 comprises instruction to initiate the operation by the control unit 28, respectively.

Additionally the engine 12 may a dual fuel engine, so its operation and the supervising arrangement 10 described in connection with the FIG. 1 applies also to the embodiment of FIG. 2. Thus, in this embodiment the at least one operational restriction comprises preventing the switching the selective catalytic reduction system off.

Figure 3:
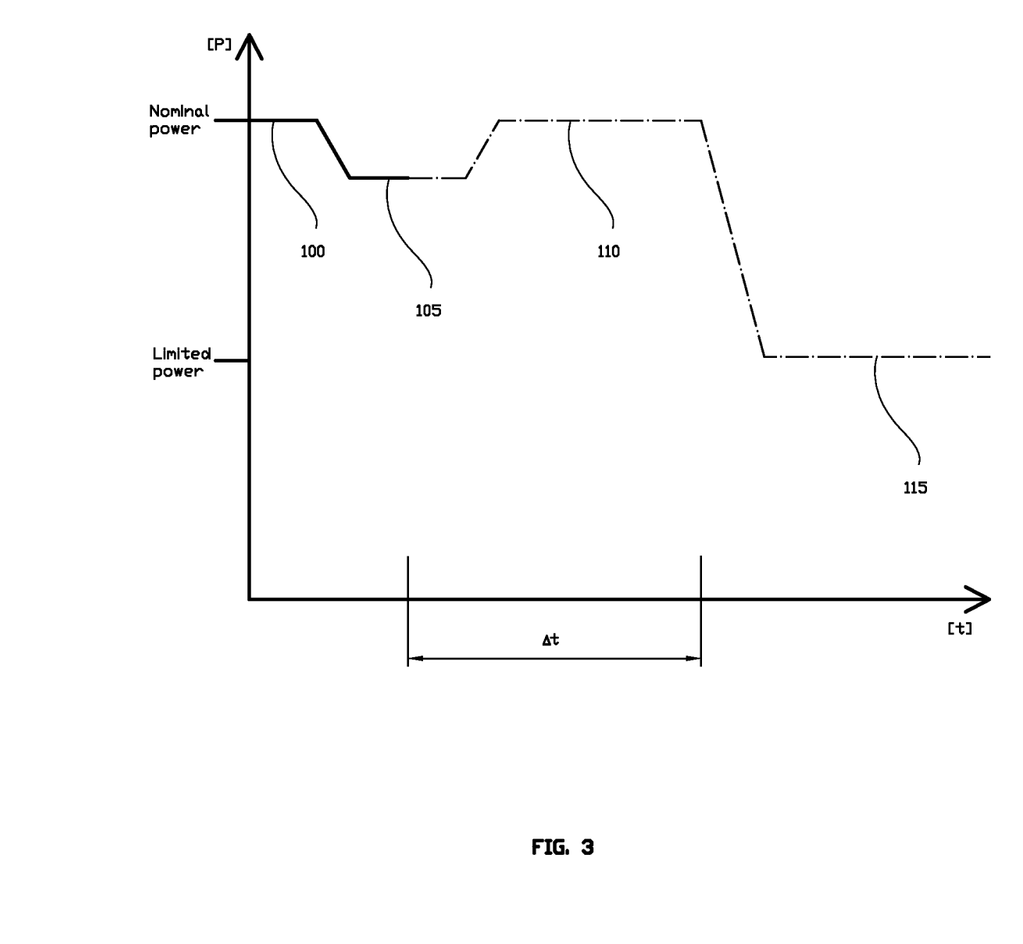

In FIG. 3 there is show an exemplary chart describing the present invention implemented in a dual fuel internal combustion piston engine. The vertical axis represent relative load of the engine 12 and the horizontal axis represent time. Some aspects about the restricted mode operation and instructions for dual fuel engine 12 are described in the following with the reference to FIG. 3 in more detailed manner. The engine is operated making use of an accepted mode of operation, for example operating in the gas mode (FIG. 1) or using SCR system (FIG. 2), during which nominal power is available for use. This situation is depicted with solid line 100. In case of an emergency situation (e.g. malfunction in the gas fuel system) the available power is decreased as in depicted by 105.

According to an embodiment of the invention the instructions for emergency circumstances include granting full nominal power operability in diesel mode as is depicted by reference 110. Now, the engine 12 may be operated by using the MDO for both the pilot fuel and main fuel. But as is shown by Δt in the horizontal axis, the instructions for emergency circumstances include also setting a time period for full power to a predetermined time. The time is advantageous 2 hours, at most. After the predetermined time has lapsed only a limited power is allowed as is depicted by reference 115. Thus, the restricting of operation in the diesel mode may comprise granting a predetermined number of hours operation at nominal power and after that less than the nominal power. The illustration of FIG. 3 can be applied to various exhaust gas emission abatement system external or internal to the engine and operational steps and/or procedures relating to the method operating the engine, as well as technical devices applicable to an internal combustion engine such as selection between at least two different fuel, using of exhaust gas emission abatement device, such as catalytic or non-catalytic exhaust gas reduction system, internal and/or external exhaust gas recycling, water injection into the combustion air and/combustion process, etc.

According to an embodiment of the invention a resetting the emergency circumstances s only possible after 30 minutes of operation free of fault conditions in the gas mode or accepted mode, generally.

While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A method of operating a dual fuel internal combustion engine operable in a gas mode and in a diesel mode in a marine vessel and comprising a control unit adapted to control the dual fuel internal combustion engine, the control unit performing the steps of:
providing a restriction information map by assigning geographical areas with one or more predetermined operational restrictions which are set for the dual fuel internal combustion engine,
acquiring location information of the vessel by means of a location information receiving system provided in the marine vessel,
acquiring the actual operational mode of the dual fuel internal combustion engine,
reading the restriction information map to obtain the restriction information relevant to the current location of the vessel,
and controlling the operation of the dual fuel internal combustion piston engine by executing step of:
comparing the location information and the restriction information map, and in case the restriction information map includes one or more restrictions assigned to the current location of the vessel, initiating an intensified supervision operation of the dual fuel internal combustion engine by means of the control unit of the dual fuel engine, during which:
data logging operation is initiated and maintained which comprises
recording at predetermined time interval at least current location information of the vessel, and
a specification of used operational mode of the dual fuel internal combustion engine at the location, and saving the recorded items in a non-volatile memory media, which can be written once and read arbitrarily many times,
setting at least one operational restriction to the dual fuel internal combustion engine comprising restricting the operation of the engine in the diesel mode during the intensified supervision operation, and
in case an emergency situation is detected, cancelling the at least one operational restriction set to the dual fuel internal combustion engine, and granting full operability in the diesel mode at nominal power for a predetermined time of ≤2 hours, and after the period of time granting operation in the diesel mode at the power less than the nominal power of the engine.

2. The method of operating a dual fuel internal combustion engine in a marine vessel according to claim 1, wherein a status of safety of the vessel is monitored and in case a situation of the vessel where the vessel and/or its passengers and/or the crew are/is in imminent danger, or a special situation ruled by the officer in charge of the vessel to be an emergency situation, or a situation where the actual emergency is only about to take place, is detected the emergency detection is declared confirmative.

3. The method of operating a dual fuel internal combustion engine in a marine vessel according to claim 1, wherein the cancelling the setting of the at least one operational restriction is allowed during a limited predetermined period of time, and after the period of time has lapsed the at least one operational restriction to the dual fuel internal combustion engine is reset.

4. The method of operating a dual fuel internal combustion engine in a marine vessel according to claim 1, wherein the saving the recorded items in the non-volatile memory media is performed by defining an average saved value of a number of sequential recorded values.

5. The method operating a dual fuel internal combustion engine in a marine vessel according to claim 1, wherein the at least one operational restriction comprises restricting the operation of the engine in the diesel mode combustion heavy fuel oil.

6. The method of operating a dual fuel internal combustion engine in a marine vessel according to claim 1, wherein the method comprises granting full operability in the diesel mode in case of emergency only for a predetermined time, enabling a safe limp home operation of the vessel.

7. The method of operating a dual fuel internal combustion engine in a marine vessel according to claim 6, wherein the instructions for emergency circumstances include enabling the switch off the restriction of gas mode only in the event that a gas related failure condition is present, and the load reduction of the engine is not allowed.

8. The method of operating dual fuel internal combustion engine in a marine vessel according to claim 1, wherein the the power less than the nominal power is 50% of the nominal power.

9. The method of operating a dual fuel internal combustion engine in a marine vessel according to claim 1, wherein the dual fuel internal combustion engine comprises a selective catalytic reduction system and that the at least one operational restriction comprises preventing switching of the selective catalytic reduction system off.

10. A supervising system for a dual fuel internal combustion engine in a marine vessel, which system comprises a control unit adapted to control the dual fuel internal combustion engine, the supervising system comprising:

a location information receiving system adapted to acquire location information of the vessel, a processing unit, which is arranged to communicate with the location information receiving system and the control unit, an input unit for acquiring the actual operational mode of the dual fuel internal combustion engine from the control unit, the input unit is arranged,
- to read a restriction information map in which geographical areas are assigned with one or more predetermined operational restrictions, and
- to obtain the restriction information relevant to the current location of the vessel, and
- to compare the location information and the restriction information map, and in case the restriction information map includes one or more restrictions assigned to the current location, to initiate an intensified supervision operation of the dual fuel internal combustion engine, during which
  - the processing unit is arranged to initiate and maintain a data logging operation to record at predetermined interval at least:
    - current location information of the vessel, and
    - a specification of used operational mode of the dual fuel internal combustion engine at the location,
  - and the input unit is further arranged to save the recorded items in a non-volatile memory media which can be written once and read arbitrarily many times,
- to set at least one operational restriction to the dual fuel internal combustion engine comprising restricting the operation of the engine in the diesel mode during the intensified supervision operation, and arranged to cancel the command to the control unit of the dual fuel internal combustion engine to cancel the at least one operational restriction set to the dual fuel internal combustion engine, and granting full operability in the diesel mode at nominal power for a predetermined time of ≤2 hours, and after the period of time granting operation in the diesel mode at the power less than the nominal power of the engine.

11. The supervising system for a dual fuel internal combustion engine in a marine vessel according to claim 10, wherein the processing unit comprises instruction to record of the using a predetermined time interval and the storing the recorded items in the non-volatile memory media by defining an average value of a number of sequential recorded values.

12. The supervising system for a dual fuel internal combustion engine in a marine vessel according to claim 11, wherein the processing unit comprises further instructions to command to the control unit of the dual fuel internal combustion engine to change over to a restricted mode operation.

13. The supervising system for a dual fuel internal combustion engine in a marine vessel according to claim 10, wherein the dual fuel internal combustion engine comprises an exhaust gas emission abatement system and the processing unit comprises further instructions to preventing switching of the abatement system off.

14. The supervising system for a dual fuel internal combustion engine in a marine vessel according to claim 10, wherein the dual fuel internal combustion engine is a gas engine and the processing unit comprises further instructions to allow diesel mode operation only in emergency circumstances.

15. The supervising system for a dual fuel internal combustion engine in a marine vessel according to claim 10, wherein the processing unit comprises instructions enabling the switch off the restriction of gas mode only in case of an emergency situation, and operating the engine in liquid fuel mode.

\* \* \* \* \*